United States Patent [19]

Marler et al.

[11] Patent Number: 5,173,278
[45] Date of Patent: Dec. 22, 1992

[54] DENITRIFICATION OF FLUE GAS FROM CATALYTIC CRACKING

[75] Inventors: David O. Marler, Deptford; Ajit V. Sapre, W. Berlin; David S. Shihabi, Pennington, all of N.J.; Richard F. Socha; Scott A. Stevenson, both of Newtown, Pa.

[73] Assignee: Mobil Oil Corporation, Fairfax, Va.

[21] Appl. No.: 669,821

[22] Filed: Mar. 15, 1991

[51] Int. Cl.$^5$ .................... B01J 8/00; C01B 21/00; C10G 11/00; C10G 11/02
[52] U.S. Cl. .................... 423/239; 423/236; 208/113; 208/120
[58] Field of Search .................. 423/236, 239, 239 A; 208/113, 120

[56] References Cited

U.S. PATENT DOCUMENTS

| | | | |
|---|---|---|---|
| 4,778,665 | 10/1988 | Krishnamurthy et al. | 423/239 |
| 4,973,399 | 11/1990 | Green et al. | 208/120 |
| 4,980,052 | 12/1990 | Green et al. | 208/120 |

FOREIGN PATENT DOCUMENTS

WO88/02659  4/1988  PCT Int'l Appl. ............. 423/239

*Primary Examiner*—Gregory A. Heller

[57] ABSTRACT

A flue gas that contains small amounts of both HCN and NO$_x$, produced, for example, by catalyst regeneration in the fluid catalytic cracking of a petroleum gas oil, is readily denitrified by the catalyzed reaction that proceeds approximately according to:

$$HCN + NO \rightarrow N_2(gas) + CO + CO_2 + H_2O$$

If the molar ratio of HCN to NO in the flue gas is about 1.0, e.g. in the range of about 0.8 to 1.2, effective denitrification is achieved without first changing the composition of the flue gas by contacting it with catalyst under conversion conditions including elevated temperature. If the molar ratio of HCN to NO exceeds 1.2, the ratio may be adjusted to about 1.0 to 1.1 by thermal or catalytic oxidation in the presence of oxygen gas, followed by catalytic denitrification. If the molar ratio is less than about 0.8, the effective molar ratio is adjusted to about 1.0 to 1.1 by adding NH$_3$ gas, followed by denitirification. In all three instances an excessive content of carbon monoxide in the flue gas may be corrected by passing the denitrified flue gas to a CO-boiler.

Catalysts for the denitrification reaction are described and exemplified by crystalline zeolites of the ZSM-5 type, and by vanadium oxide supported on titania.

30 Claims, 4 Drawing Sheets

DENITRIFICATION OF FLUE GAS FROM CATALYTIC CRACKING

FIELD OF THE INVENTION

This invention is concerned broadly with the combustion of fossil fuels that contain organic nitrogen, and with the attendant atmospheric pollution which accompanies such combustion. It is more particularly concerned with reducing the emissions of noxious nitrogen compounds, more fully defined hereinbelow, in the process for catalytic cracking of petroleum oils. In such cracking process the catalyst is continuously passed from the cracking zone to a regeneration zone where coke, deposited during cracking, is burned to form a flue gas that contains, inter alia, excessive quantities of toxic nitrogen compounds. Thus, this invention is most particularly concerned with the abatement of excessive emissions of toxic nitrogen compounds in the process for regenerating coked cracking catalyst.

BACKGROUND OF THE INVENTION

Catalytic cracking is an established and widely used process in the petroleum refining industry for converting oils and residua of relatively high boiling point to more valuable lower boiling products including gasoline and middle distillates such as kerosene, jet fuel and heating oil. The preeminent cracking process now in use is the Fluid Catalytic Process (FCC) in which the preheated feed is brought into contact with a hot cracking catalyst that is in the form of a fine powder, typically with a particle size of 10-300 microns, usually about 60 microns, for the desired cracking reactions to take place. During the cracking, coke is deposited on the catalyst and this results in a loss of activity and selectivity. The coke is removed by continuously removing the deactivated catalyst from the cracking reactor and oxidatively regenerating it by contacting it with air in a regenerator. The combustion of the coke is a strongly exothermic reaction which, besides removing the coke, serves to heat the catalyst to the temperatures appropriate for the endothermic cracking reaction. The process is carried out in an integrated unit comprising the cracking reactor, the regenerator and the appropriate ancillary equipment. The catalyst is continuously circulated from the reactor to regenerator and back to the reactor with the circulation rate being adjusted relative to the feed rate of the oil to maintain a heat balanced operation in which the heat produced in the regenerator is sufficient to maintain the cracking, with the circulating, regenerated catalyst being used as the heat transfer medium. Typical fluid catalytic cracking processes are described in the monograph Fluid Catalytic Cracking with Zeolite Catalysts, Venuto, P. B. and Habib, E. T., Marcel Dekker Inc., N.Y. 1979, to which reference is made for a description of such processes. As described in the monograph, the catalysts which are currently used are based on zeolites, especially the large pore synthetic faujasites, Zeolites X and Y, which have generally replaced the less active, less selective amorphous and clay catalysts formerly used.

Another catalytic cracking process still used in the industry is the moving, gravitating bed process, one form of which is known as Thermofor Catalytic Cracking (TCC) which operates in a similar manner to FCC but with a downwardly moving gravitating bed of a bead type catalyst, typically about 3-10 mm in diameter. Fixed bed units have now been replaced by fluidized or moving bed units of the FCC or TCC type. It should be noted that all references made herein to "catalytic cracking", "fluid catalytic cracking", FCC and TCC processes, and the like, refer to and mean cracking in the absence of added hydrogen, as distinguished from hydrocracking, in which the feed and gaseous hydrogen are contacted with a hydrocracking catalyst. Although both processes result in boiling point reduction of a heavy oil, the catalyst, the process conditions, the process itself, and the nature of the products are very different.

The feed to the catalytic cracker can generally be characterized as a high boiling oil or residuum, either on its own or mixed with other fractions, usually of a high boiling point. The most common feeds are gas oils, that is, high boiling, non-residual petroleum distillate oils with an initial boiling point usually above about 230° C. (about 450° F.), more commonly above about 345° C. (about 650° F.), with end points of up to about 620° C. (about 1150° F.). Typical gas oil feeds include straight run (atmospheric) gas oil, vacuum gas oil and coker gas oil; residual feeds include atmospheric residua, vacuum residua and residual fractions from other refining processes. Oils from synthetic sources such as Fischer-Tropsch synthesis, coal liquefaction, shale oil or other synthetic processes may also yield high boiling fractions which may be catalytically cracked either on their own or in admixture with oils of petroleum origin.

Aside from foreign matter such as rust, brine, sand and water, catalytic cracker feeds consist almost totally of organic compounds, some of which may be organometallic. More directly pertinent to the present invention is that the organic compounds which make up the feed, i.e. the very complex mixture of paraffins, naphthenes and aromatic compounds, normally include a small but significant complement of sulfur, nitrogen and oxygen heteroatoms. These elements often are referred to as "contaminants" in petroleum refining technology because they serve no obvious useful role in fuel and lubricant products, but contribute instead to catalyst deterioration in processing, and to air pollution when the product is used as a fuel. It is well to recognize, however, that these heteroatom contaminants are integral parts of the chemical structure of the hydrocarbon feed, i.e. they are chemically bound parts of the feed molecules in the same sense as is the nitrogen atom in pyridine. The term "organic nitrogen" as used herein means contaminant nitrogen that is a chemically bound part of the organic feed or of the coke.

In view of their nature, it becomes understandable that the heteroatom contaminants in the feed cannot be readily removed by conventional means which are effective with physical contaminants such as sand and rust. The organic nitrogen in the feed is very pertinent to the present invention since it is generally conceded to be the only significant precursor for the noxious nitrogen compounds in the regenerator flue gas. Feeds in general contain from 0.05 to 0.5 weight percent nitrogen (500-5000 ppmw) although some synthetic feeds such as shale oil may have higher contents.

In the catalytic cracker, the feed together with its organic nitrogen are raised to a cracking temperature usually in the range of about 470° to 520° C. (riser top temperature) by contact with hot regenerated catalyst, under which conditions a portion of the feed is cracked, with simultaneous formation on the catalyst of a carbonaceous deposit which is generally called "coke". This coke deposit is very largely formed of carbon and hydrogen, and usually it can be described by the empirical formula of $C_nH_{0.5n} - C_nH_n$. More careful examination of the coke shows that it contains a small amount of organic nitrogen, generally somewhat less than can be accounted for by the total nitrogen in the feed.

The coked catalyst, on being passed to the regenerator, is contacted with air at a temperature usually of about 650° to 750° C. to provide hot regenerated catalyst which is returned to the cracker, and a flue gas. Almost all of the flue gas consists of elemental nitrogen introduced with the air, together with relatively large amounts of the expected combustion products, including water vapor, carbon monoxide and carbon dioxide. Of these combustion products, the water vapor is inherently benign, and the carbon dioxide, although of long-range ecological interest, has low toxicity and may be regarded as a necessary waste product of catalytic cracking, barring some unforeseen and radical change in future cracking technology. Carbon monoxide, however, is a different matter. Carbon monoxide is produced together with carbon dioxide whenever carbonaceous material is burned. When burning FCC. coke, the ratio of $CO_2$ to CO in the flue gas is known to depend on combustion conditions including temperature, availability of oxygen, and the presence or absence of CO-combustion catalysts. Unlike carbon dioxide, carbon monoxide is toxic and it is known to contribute to urban smog. Also, unlike carbon dioxide, carbon monoxide has value as a fuel and may be used to produce steam. In the absence of a CO-combustion catalyst, the ratio of $CO_2/CO$ in the flue gas usually is in the range of about 1.0 to 2.0. Since two thirds of the heat of combustion of carbon to $CO_2$ is associated with the conversion of CO to $CO_2$, it is apparent that such conversion can generate significant heat value. While the negative attributes of carbon monoxide led government authorities to impose restrictions on allowable emissions of this substance, its fuel value suggested the use of a CO-boiler as a low-cost means of compliance. Thus, for at least several decades before 1972 when a new FCC. catalyst became available, refiners controlled burning in the regenerators of FCC. plants to form a flue gas relatively rich in CO but limited in excess oxygen, and passed this flue gas with additional air to a CO-boiler to recover heat values as process steam.

The primary purpose of a refinery CO-boiler is to incinerate the flue gas formed in the FCC. regenerator. In the CO-boiler, the flue gas is incinerated by mixing with a high excess air flame from a conventional burner operated typically on refinery gas fuel. The fuel gas burner supplies both heat and oxygen for oxidation of virtually all of the CO to carbon dioxide ($CO_2$) if the unit is properly designed for rapid and complete mixing of the burner products with the flue gas. This mixing must occur early in the furnace well before the gases contact convective cooling surface. In most cases, the unit must be designed for effective mixing over a range of fuel/flue gas input ratios since the boiler may follow refinery stream demand by variation in fuel input rate while flue flow rate remains essentially constant.

In a paper presented at the 77th Annual Meeting of the Air Pollution Control Association, Jun. 24–29, 1984, H. B. Lange et al. present a study on $NO_x$ emissions from CO-boilers, including some useful bench mark reactions which are here reproduced.

$$N_2 + O_2 \rightarrow NO \tag{1}$$

They report that this reaction takes place in the absence of a catalyst and in the presence of excess oxygen at temperatures above about 1525° C. in the boiler furnace, and is avoided by adjustments to reduce simultaneous occurrence of high $O_2$ and high temperature levels. The next reaction discussed is:

$$NH_3 + O_2 \rightarrow NO + H_2O \tag{2}$$

This oxidation takes place in the absence of a catalyst and in the presence of excess oxygen at temperatures about 1025° C.

Denitrification reactions include:

$$NH_3 + NO \text{ (fuel rich mix)} \rightarrow N_2 + H_2O \tag{3}$$

$$NH_3 + NO \text{ (excess } O_2\text{)} \rightarrow N_2 + H_2O, \tag{4}$$

Reaction 3 is reported to proceed in the absence of a catalyst in the temperature range of about 1100° to 1210° C., and proceeds only in a fuel-rich mixture. Reaction 4 is reported to proceed in the somewhat lower temperature range of about 925° to 1025° C. Equations 1–4 represent complex reaction chains and show only major species; they are not stoichiometrically balanced.

In about 1972, a catalyst modification became available which allowed the refiner to burn up part or all of the carbon monoxide in the regenerator, thus providing emissions control of carbon monoxide and recovery of heat values without use of a CO-boiler. This development is described in U.S. Pat. Nos.: 4,072,600; 4,088,568; and 4,093,533, all to Schwartz, incorporated herein by reference for background purposes.

In addition to the major combustion products described above, flue gas also contains very much smaller quantities of nitrogen oxides. Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various government authorities to restrict industrial emissions in an attempt to limit the level of the oxides in the atmosphere. Nitric oxide and nitrogen dioxide, under appropriate conditions, are interconvertible according to the equation $$2NO + \tfrac{1}{2}O_2 \rightleftharpoons 2 NO_2 \tag{5}$$

For purposes of the present invention, $NO_x$ will be used herein to represent nitric oxide, nitrogen dioxide, and mixtures thereof.

The so-called "stable" nitrogen oxides have in common the somewhat peculiar property that although they are thermodynamically very unstable with respect to decomposition into elemental oxygen and nitrogen, no simple, economical method has been described for inducing this decomposition. It has been discovered, however, that adding a reductant such as ammonia to the exhaust gas can, under appropriate reaction conditions, convert $NO_x$ to elemental nitrogen and steam.

U.S. Pat. No. 3,900,554 to Lyon describes a homogeneous gas phase reaction to remove $NO_x$ from combustion effluents by adding 0.4 to 10 mols (preferably 0.5 to 1.5 mols) of ammonia per mole of $NO_x$ followed by heating to 1600° C. to 2000° C. (See Equation 4, above.) The $NO_x$ content is lowered as a result of its being reduced to nitrogen by reaction with ammonia. The method is reported to work best if hydrocarbon is also added to the mixture.

U.S. Pat. No. 4,220,632 to Pence et al. discloses a process for reducing noxious nitrogen oxides from a fossil-fuel-fired power generation plant, or from other industrial plant off-gas stream, to elemental nitrogen and/or innocuous nitrogen oxides employing ammonia as reductant and, as catalyst, the hydrogen or sodium form of a zeolite having pore openings of about 3 to 10 Angstroms. The process of adding ammonia to industrial flue gas followed by contact with a catalyst at a temperature in the range of about 250°–550° C. to denitrify the flue gas has come to be known as the process for Selective Catalytic Reduction (SCR) of $NO_x$. In order to avoid confusion, any reference made herein to "Selective Catalytic Reduction", or to "SCR", is intended to refer to only that process in which a mixture of $NO_x$ and $NH_3$ are induced to react catalytically at elevated temperature, and to exclude processes in which other reductants such as CO or hydrogen gas are substituted for $NH_3$.

The term "denitrify" as used herein, means to reduce the amount of one or more noxious nitrogen compounds (such as NO, $NO_x$ and HCN) contained in a waste gas, preferably by conversion to nitrogen gas, or else to a relatively innocuous nitrogen compound such as nitrous oxide ($N_2O$). (See, for example, "Webster's New World Dictionary" 2nd College Edition, Prentice Hall Press, 1984.)

U.S. Pat. No. 4,778,665 to Kiliany et al. describes an SCR process for pretreating industrial exhaust gases contaminated with $NO_x$ in which the catalyst has a silica to alumina ratio of at least 50 and a Constraint Index of 1 to 12. The entire contents of this patent are incorporated herein by reference as if fully set forth.

While the SCR process does furnish a means for abatement of $NO_x$ emissions, it is relatively complex, it requires furnishing large amounts of ammonia, and it requires a sophisticated control system to insure that neither excess amounts of $NO_x$ nor unreacted ammonia is emitted. There is clear need for novel, inexpensive methods for abatement of industrial $NO_x$ emissions.

Before describing the role of hydrogen cyanide (HCN) in denitrification of flue gases, a brief description of its relevant properties is in order. HCN is a liquid at atmospheric pressure that boils at 25.7° C. and freezes at −13.24° C. It is highly flammable, and burns with a heat of combustion of 159.4 kCal/mol. It forms explosive mixtures with air, and it has unlimited solubility in water. For further description of its physical and chemical properties, including health and safety factors in handling, see "Encyclopedia of Chemical Technology", Kirk-Othmer, Vol. 7, pp. 307–319 (1979), incorporated herein by reference for background.

HCN is hydrolyzed in the presence of an appropriate catalyst to form ammonia by the reaction:

$$HCN + H_2O = NH_3 + CO \qquad (6)$$

European Patent 0051156 describes the conversion of HCN to $NH_3$ over copper oxide, iron oxide, or chromium oxide ($Cr_2O_3$) at temperatures of between 100° and 500° C.; conversions of more than 90% are disclosed. A process is described in Japanese Disclosure 53005065 in which HCN is hydrolyzed to ammonia by at least one oxide of the elements Al, Ce, Zr, Mg, Ca, Ba, Na, K, Mo, V, Fe, Co, Ni, Cu, Mn, Ag, and La. Patent DE-OS 23 41 650 describes a process in which HCN is hydrolyzed with $H_2O$ at temperatures above 93° C. in the presence of a catalyst that contains at least an alkali metal hydroxide supported on aluminum oxide, silica, silica-alumina, or a zeolite. The patents noted above are incorporated herein by reference as if fully set forth.

SUMMARY OF THE INVENTION

Figure 1:
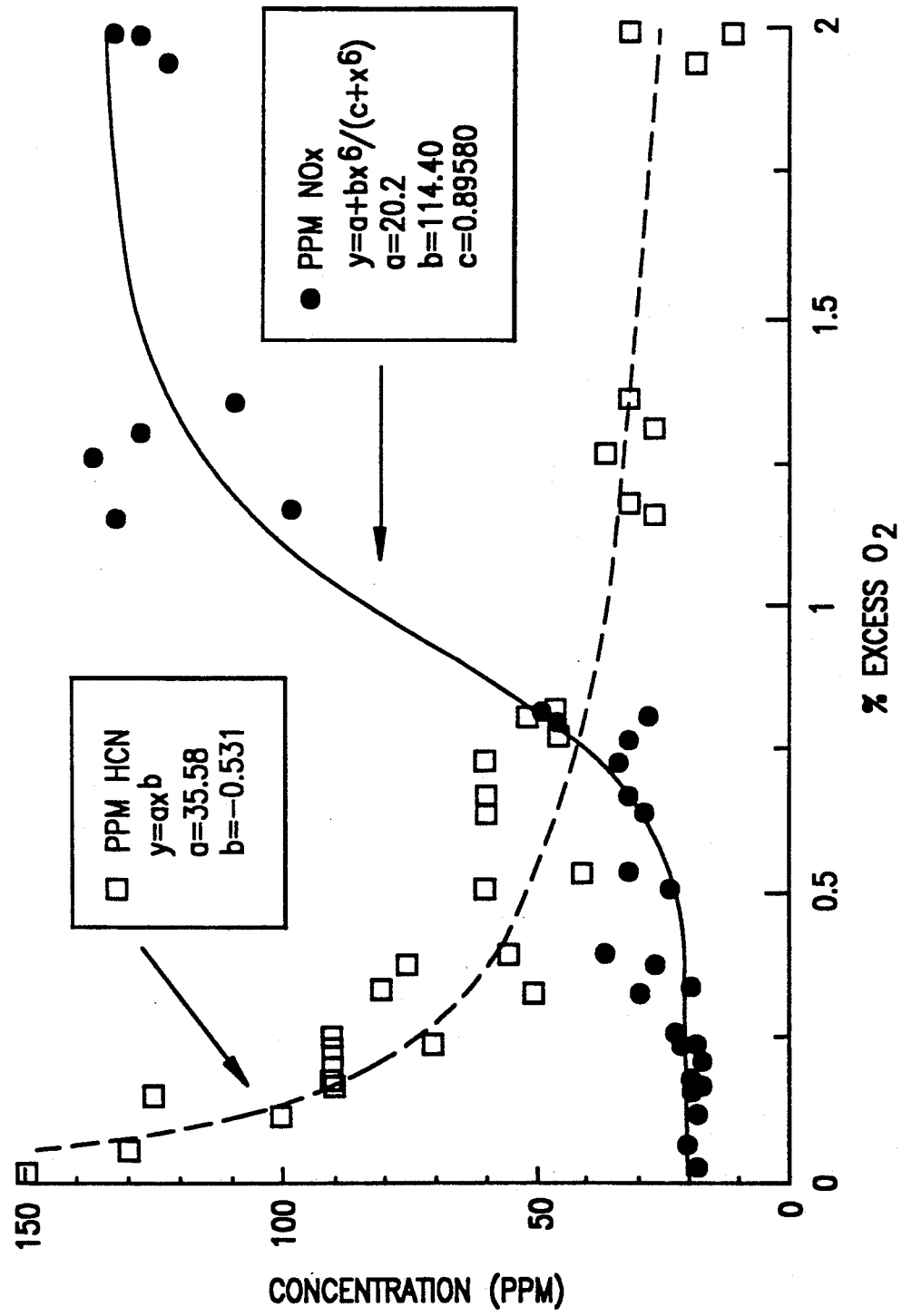
FIG. 1. Dependence of $NO_x$ and HCN concentrations on excess oxygen in flue gas.

The present invention is based on the discovery that regeneration of fluid cracking catalyst generates a flue gas that may contain small amounts of hydrogen cyanide (HCN) in addition to small amounts of nitric oxide (NO). The invention is based on the further discovery that although mixtures of hydrogen cyanide and nitric oxide do not readily react at temperatures below 500° C., they may be made to do so by contact with a suitable catalyst, all as more fully described hereinbelow.

Accordingly, in one embodiment of the invention (Embodiment A), a flue gas formed in the regeneration of an FCC. catalyst and containing small amounts of both HCN and $NO_x$ is passed, before discharge to the atmosphere, to a denitrification zone wherein the flue gas is contacted under conversion conditions with a catalyst that is active for the selective catalytic reduction of $NO_x$, said catalyst being selected from the group consisting of supported transition metals and crystalline zeolites, said contacting being conducted in the optimal temperature range for converting said unwanted HCN and at least a fraction of the $NO_x$ to a mixture comprising nitrogen gas, and discharging the denitrified flue gas to the atmosphere, thereby reducing air pollution, as more fully described hereinbelow.

In another embodiment of the invention (Embodiment B), the flue gas described in Embodiment A is directly passed, without addition of ammonia, to a denitrification zone wherein the flue gas is contacted under conversion conditions with a catalyst that is active for the selective catalytic reduction of $NO_x$, said catalyst being that described in Embodiment A, whereby converting said unwanted HCN and at least a fraction of the $NO_x$ to a mixture containing nitrogen gas, and thereby reducing air pollution on discharging the denitrified flue gas to the atmosphere.

In another embodiment of the invention (Embodiment C), wherein the flue gas contains a significant amount of carbon monoxide in addition the HCN and $NO_x$, and wherein a CO-boiler is used to incinerate the CO to $CO_2$ before discharge to the atmosphere, the flue gas (including carbon monoxide) is passed to a denitrification zone wherein the flue gas is contacted under conversion conditions with a catalyst that is active for the selective catalytic reduction of $NO_x$, said catalyst being that described in Embodiment A, whereby converting said unwanted HCN and at least a fraction of the $NO_x$ to a mixture comprising nitrogen gas; and, passing the denitrified flue gas to the incineration zone thereby reducing air pollution from carbon monoxide, HCN and $NO_x$ on discharging the flue gas to the atmosphere.

In another embodiment of the invention (Embodiment D), the invention of Embodiment C. wherein the molar ratio of HCN to $NO_x$ in the flue gas formed in the regeneration zone is equal to or greater than about 1.2, and including the step of reacting at elevated temperature a portion of said HCN with air to form $NO_x$ thereby reducing the molar ratio of HCN to $NO_x$ in the flue gas to about 1.0 prior to passage of the flue gas to the denitrification zone.

Although the invention as described herein emphasizes reducing emissions of noxious nitrogen compounds on discharge to the atmosphere of the flue gas from an FCC. regenerator, it is contemplated that the invention is broadly applicable to any industrial exhaust gas contaminated by significant quantities of both HCN and $NO_x$.

Therefore, in another embodiment of the invention (Embodiment E), a process is provided for treating an industrial exhaust gas contaminated with HCN and $NO_x$, and further characterized by a molar ratio of HCN to $NO_x$ of about 0.1 to about 0.9, which process comprises:

passing the exhaust gas to a denitrification zone wherein the gas is contacted under conversion conditions with a catalyst that is active for the selective catalytic reduction of $NO_x$, said catalyst being more particularly described in Embodiment A, whereby converting said unwanted HCN and at least a fraction of the $NO_x$ to a mixture comprising nitrogen gas, and discharging the denitrified flue gas to the atmosphere, thereby reducing air pollution.

In the above Summary and elsewhere in this description we have used the term "small amounts" in reference to the $NO_x$ content or the content of noxious nitrogen compounds contained in the flue gas. In this context, FIG. 1 serves to indicate the range of concentrations of HCN and of $NO_x$ that one may expect to encounter for a particular feed. We note that the hydrogen cyanide content goes from about 150 ppm (parts per million by volume) down to about 25 ppm with increasing excess oxygen, while the $NO_x$ content increases from about 20 ppm to about 130 ppm. In brief, the total noxious nitrogen compounds appears to be below 200 ppm, or less than 0.02 volume percent of the total flue gas. Other feeds and solid fossil fuels such as coal and peat may generate higher contents of noxious nitrogen compounds, such as 0.10 volume percent or even 1.0 volume percent in extreme cases. These concentrations all remain within the ambit of "small amounts", as that phrase is used herein.

DETAILED DESCRIPTION INCLUDING BEST MODE

Figure 2:
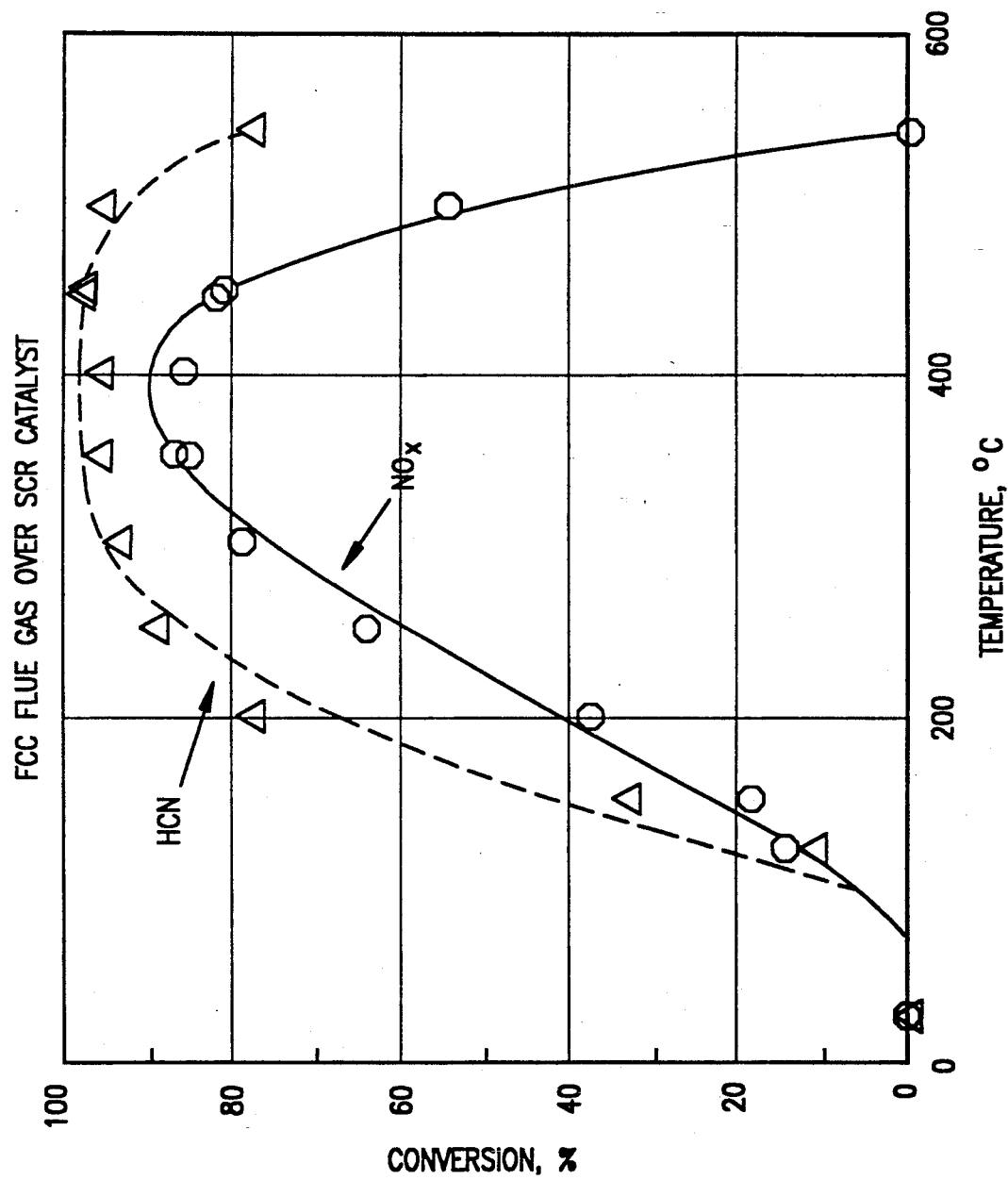
FIG. 2. Effect of temperature on reaction of $NO_x$ and HCN over SCR catalyst.

The catalyzed reaction of equimolar concentrations of HCN and $NO_x$ at temperatures in the range of about 150° to 550° C. is described in Example 2 and FIG. 2 of the drawing. The data that we have obtained indicate that the principal product of the reaction is nitrogen gas. As shown in FIG. 2, this conversion has a well-defined optimum temperature at about 390° C., although temperatures at the extreme ends of the range, 250° to 450° C., give only slightly less conversion of $NO_x$ and about the same conversion of HCN, so that this entire range over which at least 80% of the $NO_x$ and at least 90% of the HCN is converted is deemed optimal. Conversion of both HCN and $NO_x$ deteriorate rapidly at temperatures below this range, as does conversion of $NO_x$ at temperatures higher than 450° C. It should be recognized, however, that the particular temperatures shown in FIG. 2 apply to the particular catalyst used in Example 2, viz. 2% vanadium oxide and 8% tungsten oxide on a titania support. With other catalysts active for the SCR reaction, such as other transition metals or zeolites, the particular optimum temperature range to apply with each can be readily determined by a short series of experiments relating temperature to conversion of HCN and $NO_x$, as indicated by FIG. 2. Such experiments do not require inordinate effort or skill. In any case, when determination of optimal temperature range is undertaken, it is preferred that it be conducted with "whole" flue gas obtained by regenerating coked FCC. catalyst at about 700° C. with oxygen gas as in Example 2, rather than by use of a simulated flue gas made from pure HCN and NO. The reason for this is that the composition of the flue gas may vary depending on the nature of the nitrogen content of the coke, which may in turn affect the optimal temperature.

The chemical reaction of HCN and $NO_x$ to form nitrogen gas ($N_2$) appears to be a previously unknown reaction. Without wishing to be bound by theory, we may hypothesize that the overall reaction proceeds approximately as follows:

$$HCN + NO \rightarrow N_2(gas) + CO + CO_2 + H_2O, \qquad (7)$$

We note, however, that the "wet" simulated flue gas of Example 14, below, appears to provide much higher conversions than Examples 12 and 13 which also used simulated flue gases but without addition of water. This suggests that water may be involved in the reaction path or the reaction of HCN with NO, and perhaps even that HCN may be hydrolyzed to ammonia as a first step in the denitrification. However, the precise reaction sequence by which HCN and $NO_x$ react to denitrify the flue gas remains speculative at this time.

The best mode for utilizing the invention is provided when the FCC. flue gas produced by the regenerator has a molar ratio of HCN to $NO_x$ of about 1.0, since under these circumstances about 90% conversion of $NO_x$ with almost 98% conversion of HCN can be achieved without alteration of the composition of the flue gas, as indicated by Example 2. As indicated by Example 1, however, the flue gas composition is strongly influenced by the excess oxygen content of the FCC. flue gas. In general, to the extent that operation of the FCC. cracking unit is not economically compromised, changes in excess oxygen that bring the molar ratio of HCN to $NO_x$ closer to 1.0 will improve the denitrification step. In the event that the flue gas contains ammonia in addition to HCN, regardless whether the ammonia is formed directly because of the nature of the coke or of the FCC catalyst, or indirectly, as by hydrolysis of HCN, this ammonia is fully equivalent to the HCN present for purposes of the invention. For this reason, all references herein made to molar ratio of HCN to $NO_x$ are intended to be read and computed as "molar ratio of HCN plus any ammonia that is present to $NO_x$".

Figure 3:
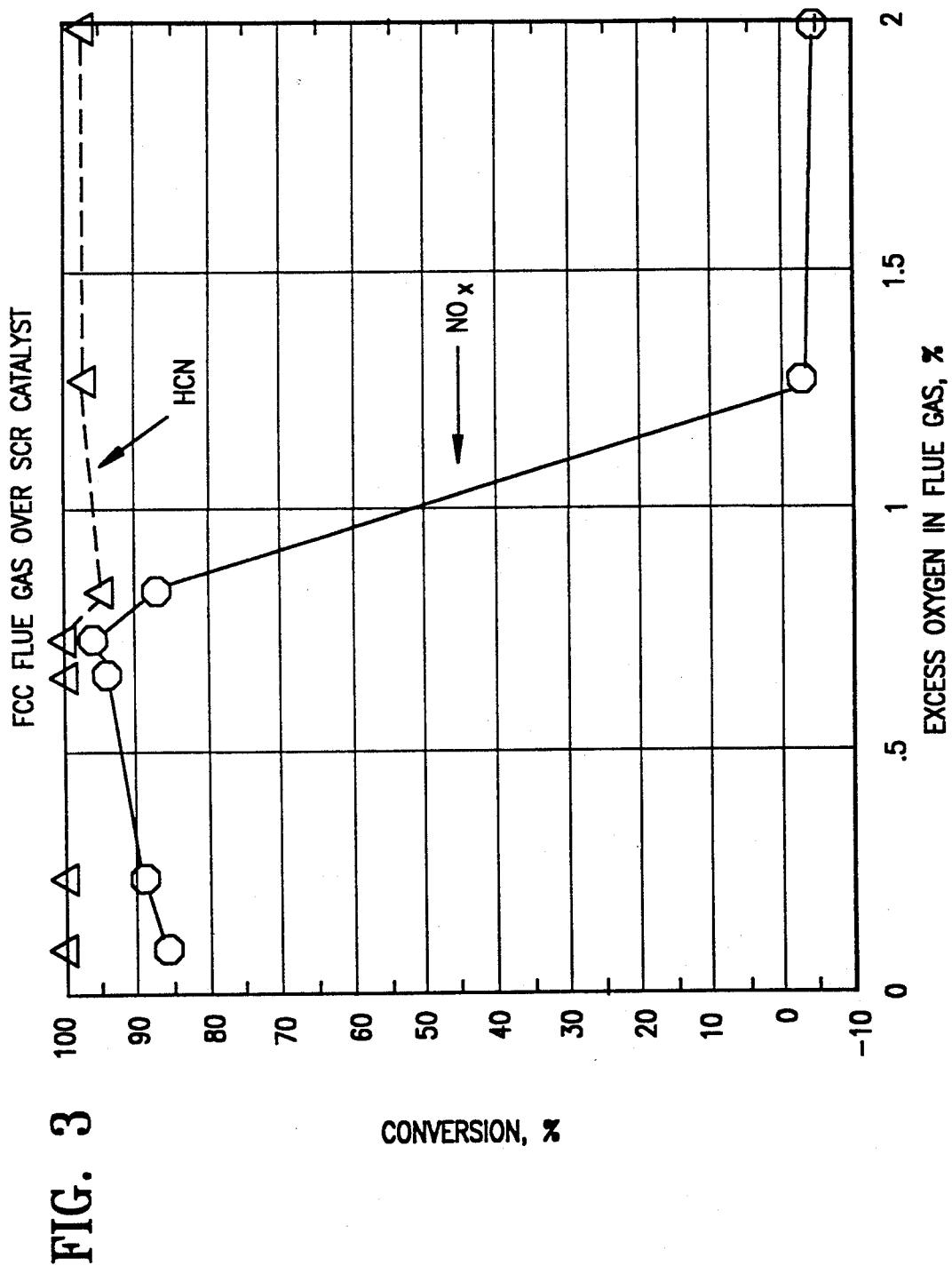
FIG. 3. Effect of excess oxygen in flue gas on residual $NO_x$ and HCN after denitrification with SCR catalyst.
Figure 4:
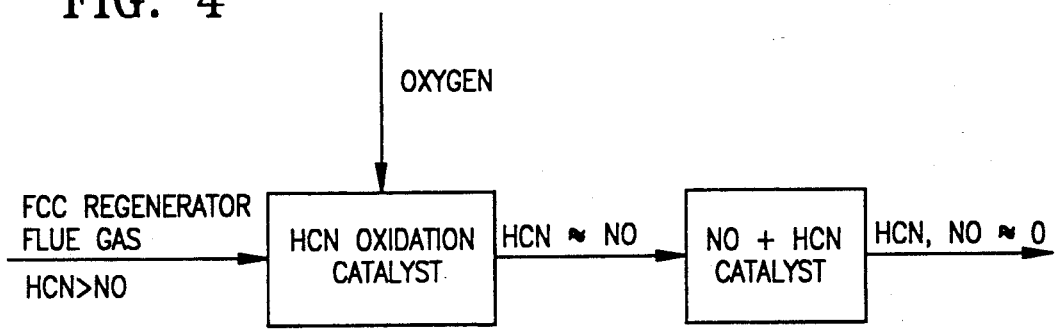
FIG. 4. Adjustment of HCN/$NO_x$ ratio
Figure 5:
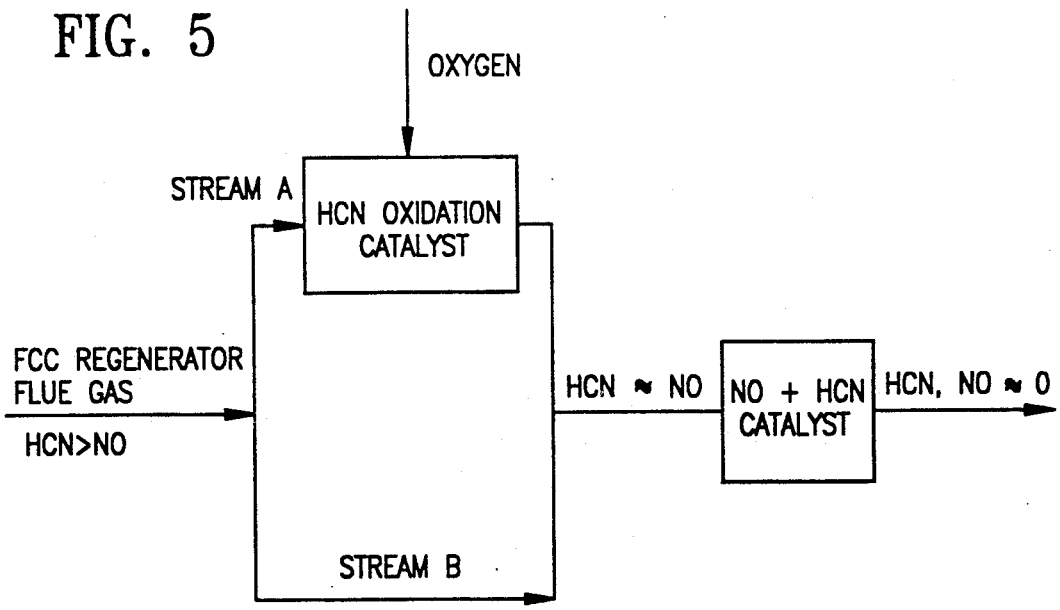
FIG. 5. Adjustment of HCN/$NO_x$ ratio with split stream

Example 3 and FIG. 3 illustrate the effect of the invention with flue gas that contains non-stoichiometric amounts of HCN and $NO_x$. We see from FIG. 3 that with up to about 0.75% excess oxygen in the flue gas, the reaction proceeds with conversion of about 90% of the $NO_x$, and with 100% of the HCN. A comparison of FIG. 3 with FIG. 1, together with Example 3 shows that as one progresses to less and less excess oxygen below the stoichiometric point, there is more and more HCN which disappears in some unaccountable manner. While this disappearance is not fully understood, it is believed that at least some of the HCN disappears due to hydrolysis. Should this ammonia prove to be an unacceptable pollutant, or should it prove too difficult or too expensive to remove from the flue gas, there is an alternate method for avoiding its formation. We have found that HCN in flue gas containing excess oxygen is thermally converted at a useful rate to $NO_x$ at temperatures above about 450° C. This is illustrated by Example 17, wherein at 500° C., over MgO catalyst, about 34% of the 100 ppm is converted to NO, with the remainder going to $NH_3$ (ammonia). FIG. 4 of the drawing illustrates a process in which a flue gas having a higher than stoichiometric ratio of HCN to $NO_x$ and containing an amount of oxygen gas is maintained under conversion conditions effective to convert a portion of the HCN to $NO_x$, thereby reducing the molar ratio to about 1.0 prior to passage of the flue gas to a denitrification zone. FIG. 5 of the drawing illustrates a modification of the concept of FIG. 4. This modification requires that the stream of flue gas be split in a predetermined fashion, and that one of the two branches be passed to a thermal or catalytic zone in which substantially all of the HCN is converted to $NO_x$, followed by recombination and passage of the recombined stream to the denitrification zone. Either of these two methods represent preferred methods for utilizing the invention, and simulate the best mode in that nothing needs to be added to the flue gas prior to the denitrification step.

The other region of FIG. 3, i.e. that in which there is a progressively larger excess of $NO_x$ as one increases excess oxygen in the flue gas, the larger excess is best remedied by controlled addition of the required amount of ammonia to the flue gas to supplement the HCN which is already present.

Catalysts for the reaction of HCN with $NO_x$ which proceeds according to Equation 7, above, may be the same catalysts as those which are known to be effective for reducing $NO_x$ with $NH_3$ in the Selective Catalytic Reduction (SCR) reaction.

Interest in the United States and abroad centering on $NO_x$ emission abatement and control has lead to a fairly large patent literature describing many inorganic compositions that catalyze the SCR reaction. Many of these contain oxides or other forms of the first series transition elements, atomic number 21-30; of the second series, atomic number 39-48; and lanthanides of atomic number 57-62, as well as other elements of the third transition series; atomic number 57 and 72-80, especially tungsten. Group VIII metals, including the platinum group metals, have been reported as SCR catalysts. In many instances the metals or oxides are provided on a porous, non-zeolitic support. Crystalline zeolites also provide a category of SCR catalysts. Some may be used alone, or they may serve as supports for transition metals. It is contemplated that catalysts that are effective for the SCR reaction will catalyze the reaction of the invention.

Examples of transition metals and/or their oxides reported as catalysts for the SCR reaction include pure noble metals such as Pt, Ru, and Pt/Au alloy; $Al_2O_3$-supported noble metals including Pt, Pd, Ru. $V_2O_5$ is an active SCR catalyst, and may be used unsupported, or supported on $TiO_2$, on $TiO_2$-$SiO_2$, on $Al_2O_3$, on bauxite, on $SiO_2$, on $SiO_2$-$Al_2O_3$ and on $ZrO_2$ or MgO. Iron activity has been reported for $Fe_2O_3$ supported on $TiO_2$, on $Al_2O_3$, on bauxite, on $SiO_2$-$Al_2O_3$, and on $ZrO_2$. A commercial SCR catalyst having the composition 2 wt% $V_2O_5$ and 8 wt% $WO_3$ on titania has high activity in the present invention (see Example 2, below).

CuO as such has been reported active in SCR and also when it is supported on $Al_2O_3$, on bauxite and on $SiO_2$-$Al_2O_3$. Active complexes with vanadium such as $Cu_2V_3O_8$ also have been reported as active.

The second class of materials that can provide catalysts for the present invention is variously known as "zeolite molecular sieves", "crystalline aluminosilicate zeolites", "crystalline zeolites" or simply "zeolites". Zeolites described as catalysts for the SCR reaction include but are not limited to natural zeolites such as clinoptilolite, chabazite, and erionite; and synthetic zeolites such as Zeolite X, Zeolite Y, synthetic mordenite, and Zeolite ZSM-5. The zeolites have been used as SCR catalysts in the hydrogen form as well as in the sodium and calcium forms, in which cases the cation is incapable of exhibiting more than one valence state. In such cases, one might assume that the catalytic ability for the SCR reaction observed with these forms is inherent in the particular zeolite structure. The zeolites also have been used after base exchange or impregnation with solutions of vanadium, tungsten, molybdenum, chromium, iron, copper, nickel, manganese, and cerium, as well as some of the platinum group metals. In these instances in which a transition metal is intimately associated with the porous crystalline structure of a zeolite, it is not uncommon to find in the patent and technical literature that the zeolite is regarded as a "support" for the metal or metal oxide. This is particularly true when the metal is introduced by impregnation, but it also applies in many cases in which the metal is introduced by ion-exchange.

For purposes of clarity, the term "supported transition metals", as used herein with respect to useful catalysts, is intended to include an inorganic support bearing any of the transition metals enumerated above and their respective oxides or other compounds that are stable in the catalytic environment of the invention. The support itself may be a stable oxide of another transition element such as titanium, as in the case of $V_2O_5$ supported on $TiO_2$. The support itself may have catalytic activity in the SCR reaction and in the reaction of the present invention. The support also may be a zeolite which has been impregnated or ion-exchanged with a solution of copper salt, for example. The term "crystalline zeolites", as used herein with respect to catalysts for the invention, means a crystalline zeolite devoid of deliberately added transition metal, regardless whether the addition be by ion-exchange, by impregnation, or by other method. Also contemplated as within the scope of useful catalysts for this invention are the supported transition metals defined above mixed with the crystalline zeolites defined above.

The preferred crystalline zeolites for use in the present invention are those having a silica to alumina ratio of at least about 10. Such zeolites in general show good stability to steam at high temperature, and thus exhibit good stability in the catalytic environment of the invention. Particularly preferred are zeolites of intermediate pore size, evidenced by a Constraint Index of 1-12, and a silica to alumina ratio of at least about 12. Determination of the silica to alumina ratio and the Constraint Index are described in U.S. Pat. No. 4,778,665 to T. R.

Kiliany et al., at column 5, line 27 to column 6, line 59, incorporated herein by reference as if fully set forth.

The intermediate pore size zeolite having a Constraint Index of 1-12 is exemplified by ZSM-5, ZSM-11, ZSM-12, ZSM-21, ZSM-23, ZSM-35, ZSM-38, ZSM-48, and other similar materials.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic cations from the forming solution. These cations are removed by heating in an inert atmosphere at 538° C. for one hour, for example, followed by base exchange with ammonium salts followed by calcination at 538° C. in air.

The particularly preferred zeolites are especially useful when ammonia needs to be cofed with the flue gas to compensate for a deficiency of HCN. In such instances, it is desirable to use an intermediate pore size zeolite that has been steamed to increase the rate of its dynamic response to changes in the feed rate of ammonia and/or composition of the flue gas. The effect of steaming on the dynamic response, and method for characterizing the dynamic response, are given in U.S. Pat. No. 4,778,665 (ibid) at column 15, line 11 to column 17, line 55, incorporated herein by reference as if fully set forth. A most particularly preferred intermediate pore size zeolite for use as catalyst or as catalyst component in the invention is one having the crystal structure of ZSM-5.

U.S. Pat. No. 4,954,325 to Rubin et al. describes a new zeolite identified elsewhere herein as MCM-22. This zeolite also is most particularly preferred for its unusual stability to steam at high temperature and its high adsorption capacity. The entire content of this patent is incorporated herein by reference as if fully set forth.

In general, it is contemplated that conversion conditions for the denitrification of FCC. flue gas or another industrial exhaust gas that contains small amounts of both HCN and $NO_x$ include those shown in Table A.

TABLE A

| CONVERSION CONDITIONS | | |
|---|---|---|
| Temperature (°C.) | Pressure (psia) | GHSV (hr$^{-1}$) |
| Broad 150–600 | 5–500 | 750–250,000 |
| Preferred 250–550 | 5–100 | 1000–50,000 |

TABLE A-continued

| CONVERSION CONDITIONS | | |
|---|---|---|
| Temperature (°C.) | Pressure (psia) | GHSV (hr$^{-1}$) |
| Most Preferred 300–500 | 10–50 | 5000–20,000 |

EXAMPLES

The examples which follow illustrate the nature of the invention. These examples, however, are non-limiting and do not limit the scope of the invention, which scope is determined by the entire specification, including the appended claims.

All references to concentrations in flue gas and given herein as "ppm" are intended to mean "parts per million by explicitly stated to be otherwise. For computation purposes, $NO_x$ is assumed to be $NO_{1.0}$ (i.e. NO) since this usually is the principal component at elevated temperature. Thus, a flue gas containing, for example, 50 ppm of HCN and 50 ppm of $NO_x$ would contain a molar ratio of HCN to $NO_x$ of 1.0 and a molar ratio of HCN to NO also of 1.0.

EXAMPLE 1

This example illustrates that both $NO_x$ and HCN may be formed on regeneration of a coked catalyst with air. It also illustrates that the relative amounts of the two compounds is systematically related to the amount of excess oxygen in the flue gas.

A batch of commercial coked FCC. catalyst was procured from a refinery. The catalyst was a conventional FCC. catalyst that contained 0.8 ppm platinum as a CO-combustion promoter, and 0.7 wt% carbon and 250 ppm nitrogen by weight as coke. The same batch of coked catalyst was used to provide flue gas whenever "coked FCC. catalyst", or simply "coked catalyst", is referred to in the examples that follow.

A number of experiments were performed using the coked FCC catalyst in which only the catalyst feed rate was varied. These experiments were conducted in a Vycor reactor that was heated to 700° C. in a tube furnace. The reactor had a volume of about 17 cm$^3$ and held approximately 8 grams of catalyst in the fluidized state. A flow of 400 cm$^3$/min of 3% oxygen in helium was used to fluidize the catalyst and burn off the coke. The coked catalyst was fed continuously at selected rates within the range of 0.5–1.5 g/min and withdrawn at the same rate. The effluent concentration of HCN at each level of excess $O_2$ in the flue gas (i.e. for each catalyst feed rate) was measured with Matheson-Kitagawa indicator tubes, and the $NO_x$ concentration was measured using a chemiluminescence detector.

FIG. 1 shows that the HCN concentration decreases with increasing excess oxygen, while the $NO_x$ concentration increases with increasing excess oxygen. The curves shown in FIG. 1 were fitted empirically by use of a computer program which allowed evaluation of available data with various polynomials. The curves shown in FIG. 1 (with corresponding equations) were judged a satisfactory fit. The correlation coefficient for the HCN curve was r=0.881, and for the $NO_x$ curve, r=0.973. No mechanistic significance is imputed, however, and the curves should be regarded as empirically representing the data over a range of about 0 to 2.0% excess oxygen in the flue gas.

The form of the curves and numerical values for HCN and $NO_x$ shown in FIG. 1 are believed to accurately represent the relationships with the particular coked catalyst and method of regeneration used in the Example. However, it would seem reasonable to expect some change of HCN and $NO_x$ values (without change of the general relationship of these to excess oxygen as shown in FIG. 1) with change of FCC. feed, FCC. catalyst and regenerator design and/or operation.

EXAMPLE 2

This example illustrates use of the catalyzed reaction of about equimolar concentrations of HCN and $NO_x$ to remove both noxious components from flue gas.

Experiments were conducted in which gas streams containing HCN and $NO_x$ are produced during regeneration of the spent FCC catalyst as described in Example 1. Coked catalyst was fed continuously by means of a screw-feed mechanism to a Vycor reactor where it was contacted with 400 cc/min of a mixture of 3% oxygen ($O_2$) in helium. This combustion reactor (regenerator) temperature was maintained at a constant 700° C. by means of a tube furnace. The catalyst flow rate was set to 0.75 g/min so that about equimolar amounts of HCN and $NO_x$ were formed. Under these conditions, 80–86% of the carbon is removed from the FCC. catalyst and the excess oxygen in the flue gas is 0.6–0.85%. The $NO_x$ concentration in the flue gas ranges from 30 to 50 ppm and the HCN concentration is 45–60 ppm.

The flue gas from the regenerator was fed to a second reactor containing 2.0 cc of a fixed bed of catalyst composed of 2% vanadium oxide and 8% tungsten oxide on titania. This material is a known catalyst for the reaction of $NH_3$ with NO to form $N_2$ and $H_2O$ and was obtained from Süddchemie. The gas hourly space velocity (GHSV) was 10,000 hr$^{-1}$, the pressure was 6 psig and the temperature was varied from room temperature to 550° C.

As seen in FIG. 2, in the optimum temperature range of about 300°–450° C. the HCN and $NO_x$ were simultaneously removed by catalytic reaction over the SCR catalyst without addition of ammonia. At 350° C., the $NO_x$ conversion is 87–96% and the HCN conversion is 95–100%. Conversion falls off at both higher and lower temperatures, as can be seen in FIG. 2. No conversion is observed in the absence of the catalyst, i.e. in an empty reactor at 350° C.

EXAMPLE 3

This example is similar to Example 2 in that a flue gas containing both HCN and $NO_x$ was generated, and the flue gas, without addition of a reducing agent (such as $NH_3$) was passed over the same SCR catalyst used in Example 2. Unlike Example 2, however, the flow rate of the coked FCC. catalyst to the regenerator was varied in stepwise fashion to show the effect of nonstoichiometric amounts of HCN and $NO_x$. In particular, all the flow rates of the coked catalyst were in the range of 0.25 to 2.25 g/min providing excess oxygen levels in the flue gas that ranged from almost 0% to 2.0%. Varying amounts of HCN and $NO_x$ were formed, as expected. (See FIG. 1).

The flue gas from the regenerator was fed to a second reactor containing the same 2.0 cc of SCR catalyst composed of vanadium and tungsten oxides on titania that was used in Example 2. The gas hourly space velocity (GHSV) was 10,000 Hr$^{-1}$, the pressure was 6 psig and the temperature was fixed at 350° C. The resultant denitrified flue gas was analyzed for residual $NO_x$ and HCN by the same methods that were used in Examples 1 and 2.

FIG. 3 shows the effect of excess oxygen during regeneration on the amount of conversion which is possible over the vanadia/titania catalyst. At regeneration conditions where the excess oxygen is high (1.2–2.0%), $NO_x$ is high (120–130 ppm) and the HCN concentration is relatively low (30–35 ppm). Under these conditions, there is little conversion of the $NO_x$ but the HCN is still reduced by more than 95% over the SCR catalyst. This is an unexpected result, and demonstrates that a reaction analogous to the SCR reaction is not the only one which is occurring, but that there must be a reaction which consumes the HCN.

At intermediate values of excess oxygen (0.5–1.2%) $NO_x$ and HCN concentrations in the flue gas are approximately equal and both HCN and $NO_x$ conversions are at their maxima.

At conditions where the excess oxygen is low, e.g. 0–0.5%, the $NO_x$ concentration is low (15–30 ppm), and the HCN concentration is high (70–150 ppm). Under these conditions, the $NO_x$ conversion falls off slightly to 85–90%, while HCN conversion remains at about 100%. Again, this cannot be accounted for by conventional SCR-type reactions.

These results show that HCN is removed from the flue gas by contact with the SCR catalyst even when the $NO_x$ is not in the correct stoichiometric amount for direct reaction of these two components.

EXAMPLES 4–9

These examples illustrate the use of a fixed bed of a ZSM-5 crystalline aluminosilicate zeolite, which is effective as an SCR catalyst, and is also a catalyst for the reaction of HCN and $NO_x$. This catalyst also removes about 100% of the HCN regardless of HCN/$NO_x$ ratio.

Gas streams containing HCN and $NO_x$ were metered from known sources or produced by regeneration of spent FCC. catalyst, as shown in Table I. These gas streams were passed over a catalyst bed containing ZSM-5, known to be a good catalyst for the SCR reaction. Our data show that it can be used advantageously in a process for removing HCN and $NO_x$ from a gas stream which contains both. Specifically, we found that 100% of the HCN is removed at temperatures higher than 250° C. regardless of $NO_x$/HCN ratio, but that the $NO_x$ conversion depends on the $NO_x$/HCN ratio. When $NO_x$/HCN is less than 1.0, good $NO_x$ conversion can be achieved. When this ratio is greater than 1.0, not all of the $NO_x$ is removed by reaction with HCN. Table 1 shows the data obtained over the various particulate ZSM-5 catalysts. Comparison of Example 8, in which the zeolite was bonded with alumina, with Example 9, in which titania was used instead of alumina, strongly suggest that at least initial catalytic effectiveness is about the same with either of the two binders.

TABLE I

| | REACTION OF $NO_x$ WITH HCN OVER ZSM-5 CATALYST BED | | | | | |
|---|---|---|---|---|---|---|
| Example | Run | $NO_x$ (ppm) | HCN (ppm) | SCR Catalyst | Temp. (°C.) | $NO_x$ Conv. (%) |
| 4 | C30 | 30 | 65 | ZSM-5/TiO$_2$ | 350 | 57 |

TABLE I-continued

REACTION OF $NO_x$ WITH HCN OVER ZSM-5 CATALYST BED

| Example | Run | $NO_x$ (ppm) | HCN (ppm) | SCR Catalyst | Temp. (°C.) | $NO_x$ Conv. (%) |
|---|---|---|---|---|---|---|
| 5 | C32 | 20 | 75 | ZSM-5/$Al_2O_3$ | 350 | 95 |
| 6 | C36 | 60 | 40 | ZSM-5/$Al_2O_3$ | 350 | 22 |
| 7 | C41 | 331 | 10 | ZSM-5/$Al_2O_3$ | 350 | 1 |
| 8 | C43 | 14 | 30 | ZSM-5/$Al_2O_3$ | 250 | 41 |
|   |     |    |    |                 | 350 | 79 |
|   |     |    |    |                 | 450 | 97 |
| 9 | C44 | 15 | 30 | ZSM-5/$TiO_2$ | 250 | 38 |
|   |     |    |    |                 | 350 | 71 |
|   |     |    |    |                 | 450 | 93 |

EXAMPLES 10-14

These examples illustrate the effectiveness of a zeolitic SCR catalyst in monolith form for catalyzing the reaction between HCN and $NO_x$.

The monolith used in these examples was manufactured by Steuler Industriewerke GmbH and consisted primarily of a ceramic made of titania and clinoptilolite with a small amount of ZSM-5 wash coated on the exterior. A sample of the monolith was crushed to provide a particle size convenient for laboratory evaluation. The results are summarized in Table II.

TABLE II

REACTION OF $NO_x$ WITH HCN OVER ZSM-5 MONOLITH

| Example | Run | $NO_x$ (ppm) | HCN (ppm) | Temp (°C.) | $NO_x$ Conv. (%) |
|---|---|---|---|---|---|
| 10 | C45 | 35 | 30 | 250 | 57 |
|    |     |    |    | 450 | 78 |
| 11 | C51 | 350 | 100* | 350 | 43 |
|    |     |     |      | 450 | 43 |
|    |     |     |      | 550 | 43 |
| 12 | C52 | 114* | 85* | 350 | 97 |
|    |     |      |     | 450 | 75 |
|    |     |      |     | 550 | 26 |
| 13 | C53 | 110* | 85* | 350 | 87 |
|    |     |      |     | 450 | 63 |
|    |     |      |     | 550 | 29 |
| 14 | C54 | 100** | 80* | 350 | 99 |
|    |     |       |     | 450 | 99 |
|    |     |       |     | 550 | 93 |

*metered from gas cylinders or from permeation device supplied by VICI METRONICS
**3% $H_2O$ added in Example 14 to simulate flue gas composition

EXAMPLES 15-16

These examples illustrate that the reaction of HCN with $NO_x$ is catalyzed by zeolites other than ZSM-5, and in this instance by MCM-22. The catalyst also effectively converts all of the HCN at temperatures above 250° C. regardless of HCN/$NO_x$ ratio.

Gas streams containing HCN and $NO_x$ were metered from known sources or produced during the regeneration of spent FCC catalyst, as indicated in Table III. These gas streams were passed over a catalyst bed containing MCM-22. This catalyst contained 65% MCM-22 and 35% alumina binder. The silica/alumina ratio of the MCM-22 was approximately 30/1. The data show that MCM-22 can be used advantageously in a process in which HCN and $NO_x$ are simultaneously removed from a gas stream by passing the gas over a MCM-22-containing catalyst. Specifically, about 100% of the HCN was removed at temperatures higher than 250° C. (i.e. in all runs shown in Table III), and the $NO_x$ conversion depends on the $NO_x$/HCN ratio. When $NO_x$/HCN is less than 1.0, good $NO_x$ conversion can be achieved. When this ratio is greater than 1.0, all of the $NO_x$ cannot be removed by reaction with HCN. The space velocity was 14,000 $cm^3$ gas/gram of catalyst/hr. The pressure was 6 psig and the temperature was varied from 250° C. to 500° C.

TABLE III

REACTION OF $NO_x$ WITH HCN OVER MCM-22 ZEOLITE

| Example | Run | $NO_x$ (ppm) | HCN (ppm) | SCR Catalyst | Temp. (°C.) | $NO_x$ Conv (%) |
|---|---|---|---|---|---|---|
| 15 | C48 | 19 | 40 | MCM-22/$Al_2O_3$ | 250 | 55 |
|    |     |    |    |                   | 350 | 51 |
|    |     |    |    |                   | 450 | 78 |
| 16 | C50 | 274 | 95* | MCM-22/$Al_2O_3$ | 350 | 27 |
|    |     |     |     |                   | 450 | 23 |
|    |     |     |     |                   | 500 | 23 |

*metered from permeation device

EXAMPLE 17

This example illustrates the selective hydrolysis of HCN to $NH_3$ over magnesium oxide catalyst. The catalyst was commercial magnesium oxide, 99.5% purity, obtained from Alfa-Johnson Mathey; it was pelletized, crushed, and sieved to 20-40 mesh and dried for 30 minutes at 400° C. before use.

Approximately 1.25 grams of a fixed bed of MgO was contacted with 400 ml/min of a gas stream containing 100 ppm HCN, 100 ppm NO, 1% $O_2$, and 1% $H_2O$ in argon at temperatures of 300°-500° C. The results are shown in Table IV. As can be seen from Table IV, no NO disappears at 300° to 500° C. even though substantial quantities of ammonia are available. Thus, Mgo is not effective as an SCR catalyst. At all temperatures in the range of 300° to 500° C., however, either some or all of the HCN is converted. At 400° C., it is estimated that the selectivity for conversion of HCN to $NH_3$ is about 94%, with some of the remainder probably going to NO. At 500° C., however, it appears that about one third of the HCN is oxidized to NO under the specified reaction conditions. Thus, MgO is an example of a catalyst that is effective for the hydrolysis of HCN to $NH_3$ but is substantially ineffective as an SCR catalyst.

TABLE IV

| | REACTIONS OF HCN OVER MgO | | | | | | | | |
|---|---|---|---|---|---|---|---|---|---|
| | Inlet (ppm) | | | | Outlet (ppm) | | | | % HCN | % NH₃ |
| T (°C.) | HCN | NO | O₂ | H₂O | HCN | NO | NH₃ | N₂O | convers. | selectivity |
| 300 | 100 | 100 | 1% | 1% | 62 | 103 | 34 | 0.4 | 38 | 91 |
| 400 | 100 | 100 | 1% | 1% | 0 | 106 | 100 | 0.7 | 100 | 94 |
| 500 | 100 | 100 | 1% | 1% | 0 | 134 | 61 | 0.6 | 100 | 64 |

What is claimed is:

1. In a process for regenerating fluid catalytic cracking catalyst that traverses a circuit comprising a cracking zone wherein fresh feed is contacted with not, active catalyst to form cracked products and a deactivating carbonaceous deposit containing bound nitrogen on the catalyst, a first separation zone wherein unconverted feed and volatile cracked products are separated form the deactivated catalyst, a regeneration zone wherein the deactivated catalyst is mixed under regeneration conditions with an amount of oxygen-containing gas effective to burn said carbonaceous deposit to form active regenerated catalyst and a flue gas comprising noxious HCN and NOx, a second separation zone wherein the regenerated catalyst and the flue gas are separated from each other with return of regenerated catalyst to the cracking zone and discharge of the flue gas to the atmosphere, the improvement comprising: passing the flue gas from the second separation zone to a denitrification zone wherein the flue gas is contacted under conversion conditions of elevated temperature with a catalyst that is active for the selective catalytic reduction of NOx by reaction with the HCN, said catalyst being selected from the group consisting of supported transition metals and crystalline zeolites, said contacting being conducted in the temperature range for converting said unwanted HCN and at least a fraction of the NOx by the reaction between the HCN and the NOx to a mixture comprising nitrogen gas, and discharging the denitrified flue gas to the atmosphere, thereby reducing air pollution.

2. The process described in claim 1 wherein said amount of oxygen-containing gas forms a flue gas that contains not more than about 1.2% excess oxygen.

3. The process described in claim 1 wherein the molar ratio of HCN to $NO_x$ in the separated flue gas is at least about 1.0.

4. The process described in claim 1 wherein at least about 80 percent of the $NO_x$ and at least about 90 percent of the hydrogen cyanide contained in said flue gas are converted in said denitrification zone.

5. The process described in claim 1 wherein the fluid catalytic cracking catalysts contains not more than about 10 ppmw (parts per million by weight) of platinum.

6. The process described in claim 1 wherein said flue gas in said denitrification zone is contacted with a crystalline zeolite catalyst having the crystal structure of ZSM-5 or MCM-22.

7. The process described in claim 1 wherein said flue gas in said denitrification zone is contacted with vanadium and tungsten oxides on a titania support.

8. In a process for regenerating fluid catalytic cracking catalyst that traverses a circuit comprising a cracking zone wherein fresh feed is contacted with not, active catalyst to form cracked products and a deactivating carbonaceous deposit containing bound nitrogen on the catalyst, a first separation zone wherein unconverted feed and volatile cracked products are separated form the deactivated catalyst, a regeneration zone wherein the deactivated catalyst is mixed under regeneration conditions with an amount of oxygen-containing gas effective to burn said carbonaceous deposit to form active regenerated catalyst and a flue gas comprising noxious HCN and NOx, a second separation zone wherein the regenerated catalyst and the flue gas are separated from each other with return of regenerated catalyst to the cracking zone and discharge of the flue gas to the atmosphere, the improvement comprising: directly passing the flue gas without addition of ammonia from the second separation zone to a denitrification zone wherein the flue gas is contacted under conversion conditions of elevated temperature with a catalyst that is active for the selective catalytic reduction of NOx by reaction of NOx with HCN in the absence of ammonia, said catalyst being selected from the group consisting of supported transition metals and crystalline zeolites, whereby converting said unwanted HCN and at least a fraction of the NOx by the reaction between the HCN and the NOx to a mixture containing nitrogen gas, and thereby reducing air pollution on discharging the denitrified flue gas to the atmosphere.

9. The process described in claim 8 wherein said amount of oxygen-containing gas forms a flue gas that contains about 0.1% to 1.2% excess oxygen.

10. The process described in claim 8 wherein the molar ratio of HCN to $NO_x$ in the separated flue gas is at least about 1.0.

11. The process described in claim 8 wherein the discharged denitrified flue gas contains not more than about 20 percent of the $NO_x$ and not more than about 10 percent of the hydrogen cyanide contained in the untreated flue gas.

12. The process described in claim 8 wherein said flue gas in said denitrification zone is contacted with a crystalline zeolite catalyst having the crystal structure of ZSM-5 or MCM-22.

13. The process described in claim 8 wherein said flue gas in said denitrification zone is contacted with vanadium and tungsten oxides on a titania support.

14. In a process for regenerating fluid catalytic cracking catalyst that traverses a circuit comprising a cracking zone wherein fresh feed is contacted with not, active catalyst to form cracked products and a deactivating carbonaceous deposit containing bound nitrogen on the catalyst, a regeneration zone wherein the deactivated catalyst is mixed with an amount of oxygen-containing gas effective to burn said carbonaceous deposit to form active regenerated catalyst and a flue gas comprising noxious HCN, NOx, and carbon monoxide; and wherein the flue gas is passed to an incineration zone wherein carbon monoxide is converted to carbon dioxide prior to discharge to the atmosphere, the improvement comprising: passing the flue gas containingHCN, NOx, and carbon monoxide from said regeneration zone to a denitrification zone wherein the flue gas is contacted under conversion conditions of elevated temperature with a catalyst that is active for the selective catalytic reduction of NOx by reaction of the NOx with HCN in the absence of added ammonia, said catalyst being selected from the group consisting of supported transition metals and crystalline zeolites, whereby converting said unwanted HCN and at least a fraction of the NOx by the reaction between the HCN and the NOx to a mixture comprising nitrogen gas; and, passing the denitrified flue gas to the incineration zone thereby reducing air pollution from carbon monoxide, HCN and NOX on discharging the flue gas to the atmosphere.

15. The process described in claim 14 wherein the molar ratio of HCN to $NO_x$ in the flue gas formed in the regeneration zone is at least about 1.0.

16. The process described in claim 14 wherein the step of denitrifying the flue gas is conducted without added ammonia.

17. The process described in claim 14 wherein the step of denitrifying the flue gas with said catalyst is conducted in the optimal temperature range for converting said unwanted HCN and fraction of $NO_x$ 18. The process described in claim 14 wherein said flue gas in said denitrification zone is contacted with a crystalline zeolite catalyst having the crystal structure of ZSM-5 or MCM-22.

19. The process described in claim 14 wherein said flue gas in said denitrification zone is contacted with vanadium and tungsten oxides on a titania support.

20. The process described in claim 14 wherein the molar ratio of HCN to $NO_x$ in the flue gas formed in the regeneration zone is equal to or greater than about 1.2, and including the step of reacting at elevated temperature a portion of said HCN with gaseous oxygen to form $NO_x$ thereby reducing the molar ratio of HCN to $NO_x$ in the flue gas to about 1.0 prior to passage of the flue gas to the denitrification zone.

21. The process described in claim 20 wherein the step of reacting a portion of said HCN with gaseous oxygen is conducted in the absence of an oxidation catalyst at a temperature of about 550° to about 750° C.

22. The process described in claim 20 wherein the step of reacting a portion of said HCN with gaseous oxygen is conducted by contacting said gases with particles of magnesium oxide (MgO) at a temperature of about 425° to 550° C.

23. The process described in claim 20 wherein only a predetermined fraction of the flue gas formed in the regeneration zone is reacted with oxygen gas at elevated temperature to convert substantially all of the HCN in that fraction to $NO_x$, and recombining that fraction with the remainder of the flue gas thereby reducing the molar ratio of HCN to $NO_x$ to about 1.0 prior to passage of the flue gas to the denitrification zone.

24. The process described in claim 23 wherein said reaction with oxygen gas is conducted by passing the flue gas through a CO-boiler.

25. A process for treating an industrial exhaust gas contaminated with HCN and NOx, and further characterized by a molar ration of HCN to NOx of about 0.1 to about 10.0, which process comprises: passing the exhaust gas to a denitrification zone wherein the gas is contacted under conversion conditions with a catalyst that is active for the selective catalytic reduction of NOx, said catalyst being selected from the group consisting of supported transition metals and crystalline zeolites, said contacting being conducted at elevated temperature for converting said unwanted HCN and at least a fraction of the NOx by reaction between the HCN and the NOx to a mixture comprising nitrogen gas, and discharging the denitrified exhaust gas to the atmosphere, thereby reducing air pollution.

26. The process described in claim 25 wherein said molar ratio of HCN to $NO_x$ is about 0.7 to about 1.3.

27. The process described in claim 25 wherein said molar ratio of HCN to $NO_x$ is about 0.9 to 1.1.

28. The process described in claim 25 wherein the molar ratio of HCN to $NO_x$ is at least about 1.0, and wherein said process is conducted in the absence of added ammonia.

29. The process described in claim 27 conducted in the absence of added ammonia.

30. The process described in claim 25 wherein said flue gas is formed by the combustion of coal.

* * * * *

UNITED STATES PATENT AND TRADEMARK OFFICE
CERTIFICATE OF CORRECTION

PATENT NO. : 5,173,278
DATED : 22 December 1992
INVENTOR(S) : David O. Marler et al.

It is certified that error appears in the above-identified patent and that said Letters Patent is hereby corrected as shown below:

Column 17, Line 12 "not" should be --hot--
Column 17, Line 63 "not" should be --hot--

Column 18, Line 53 "not" should be --hot--
Column 20, Line 17, "ration" should be --ratio--

Signed and Sealed this

Twenty-eighth Day of December, 1993

Attest:

BRUCE LEHMAN

Attesting Officer

Commissioner of Patents and Trademarks